United States Patent
Hayakawa et al.

(10) Patent No.: US 6,672,801 B2
(45) Date of Patent: Jan. 6, 2004

(54) SUBMARINE APPARATUS HAVING A SPACER MECHANISM BETWEEN A BODY AND A BOOT

(75) Inventors: Makoto Hayakawa, Kawasaki (JP); Shuichi Watanabe, Kawasaki (JP); Taiichi Takeda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 117 days.

(21) Appl. No.: 09/956,959

(22) Filed: Sep. 21, 2001

(65) Prior Publication Data

US 2002/0168231 A1 Nov. 14, 2002

(30) Foreign Application Priority Data

May 10, 2001 (JP) ........................... 2001-139501

(51) Int. Cl.[7] .................... F16L 1/00; F16L 1/12
(52) U.S. Cl. .................... 405/158; 405/160; 174/68.1
(58) Field of Search .................... 174/705, 68.1, 174/18, 65 G, 50.56, 152 G; 405/160, 166, 158, 168.3, 169, 170, 183.5, 184, 184.1, 184.4

(56) References Cited

U.S. PATENT DOCUMENTS

| | | | |
|---|---|---|---|
| 4,396,797 A | * | 8/1983 | Sakuragi et al. ............ 138/110 |
| 4,786,759 A | * | 11/1988 | Gouverneur ............... 174/70 S |
| 4,896,939 A | * | 1/1990 | O'Brien ...................... 385/56 |

FOREIGN PATENT DOCUMENTS

| | | | |
|---|---|---|---|
| JP | 57078012 A | * 5/1982 | ............ G02B/7/26 |
| JP | 6-276656 | 9/1994 | |
| JP | 8-205375 | 8/1996 | |
| JP | 9-113748 | 5/1997 | |
| JP | 9-292555 | 11/1997 | |

\* cited by examiner

*Primary Examiner*—Heather Shackelford
*Assistant Examiner*—Lisa M. Saldano
(74) *Attorney, Agent, or Firm*—Staas & Halsey LLP

(57) ABSTRACT

A submarine apparatus is laid undersea by a submarine-cable laying device. The submarine apparatus comprises a cylindrical body performing a signal processing, a conical boot arranged at each of both ends of the body so as to fix an end of a submarine cable, and a gimbal joint provided on each of both ends of the body so as to support an end of an arm portion extending from the boot. The diameter of an end of the boot is smaller than a diameter of each of both ends of the body. A spacer mechanism is provided between the body and the boot so as to occupy a part of a space therebetween.

8 Claims, 16 Drawing Sheets

$D_{10} - D_{11} = \Delta a$ $D_3 > D_2 > D_1$ $D_m \geqq D_3 > D_2 > D_1 \geqq D_b$

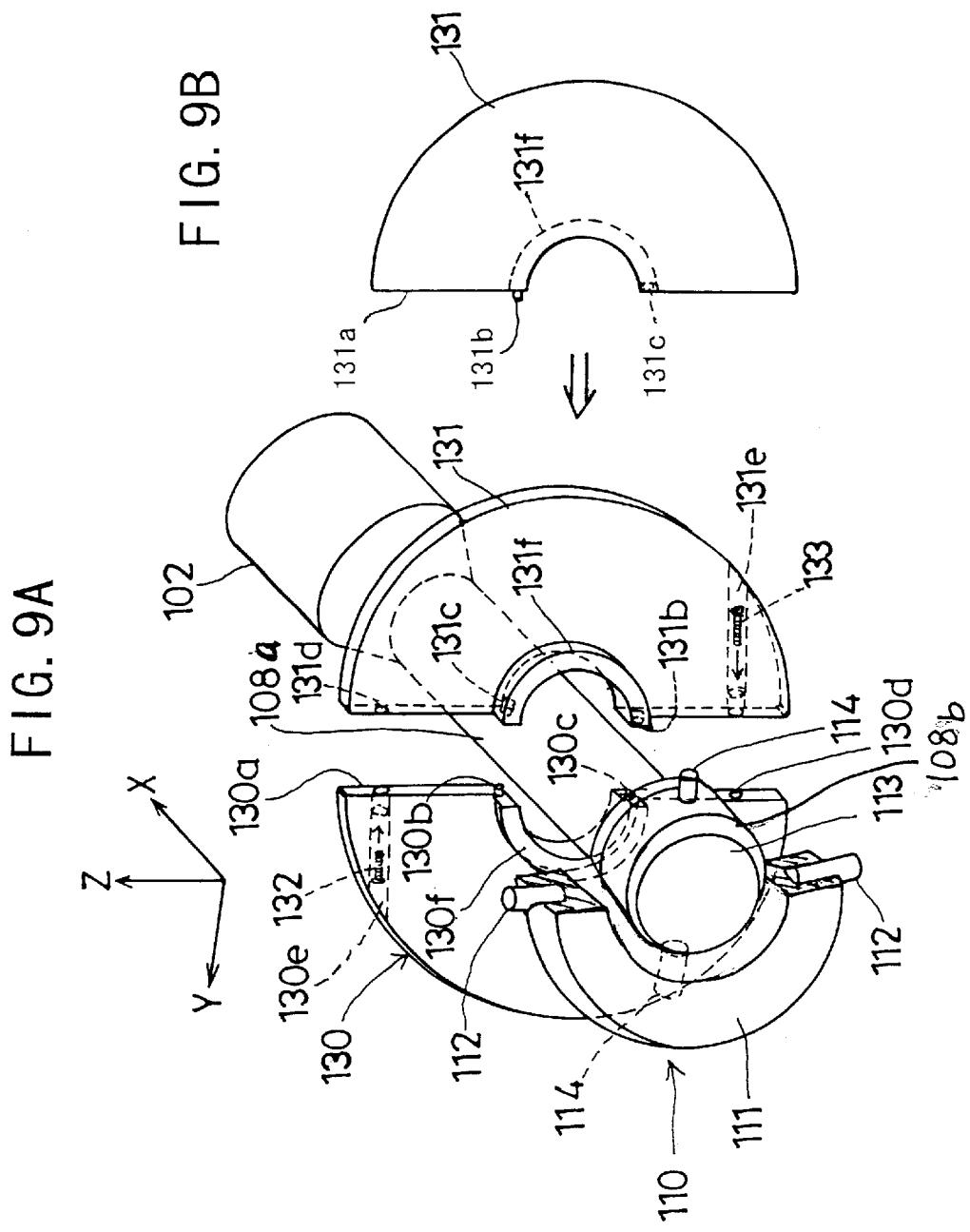

SUBMARINE APPARATUS HAVING A SPACER MECHANISM BETWEEN A BODY AND A BOOT

BACKGROUND OF THE INVENTION

1. Field of the Invention

The present invention generally relates to a submarine apparatus and, more particularly, to a submarine apparatus provided along a submarine cable together laid on a seafloor.

The "submarine apparatus" means an apparatus laid on a seafloor, such as a submarine repeating apparatus, a submarine branching apparatus, or a gain equalizer.

A submarine cable used for communication is laid on a seafloor so as to connect land to land in the distance. Submarine apparatuses, such as a submarine repeating apparatus, a submarine branching apparatus, and a gain equalizer, are provided along the submarine cable laid on the seafloor.

For convenience' sake in explanation, a description will be given of a facility used to lay a submarine cable on a seafloor, and of an operation to lay a submarine cable on a seafloor.

As shown in FIG. 1, in an operation of laying a submarine cable, a submarine cable 50 and submarine repeating apparatuses 60 are loaded onto a submarine-cable laying ship 10 equipped with a linear cable engine device 20, a sheave 30, and a submarine-cable embedding machine 40. Then, the laying ship 10 moves in a direction A1 along a laying route so that the submarine cable 50 and the submarine repeating apparatuses 60 are drawn out from the laying ship 10 in a direction A2 so as to be laid on a seafloor 70.

As shown in FIG. 2A and FIG. 2B, the linear cable engine device 20 comprises a plurality of rubber tires 21–1 to 21–6 and 22–1 to 22–6 aligned horizontally in a direction X2–X1, and cable guides 27 and 28 opposing each other transversely in a direction Y1–Y2. The rubber tires 21–1 to 21–6 and 22–1 to 22–6 oppose each other vertically in a direction Z1–Z2, respectively. The rubber tires 21–1 to 21–6 and 22–1 to 22–6 are movable vertically, and are energized in directions nearing to each other by oil hydraulic mechanisms (conveniently represented by springy members in FIG. 2B) 25 and 26. The cable guides 27 and 28 are movable transversely, are energized in directions nearing to each other by oil hydraulic mechanisms (conveniently represented by springy members in FIG. 2B) 23 and 24. This linear cable engine device 20 installed inboard guides the submarine cable 50 and the submarine repeating apparatuses 60 drawn out from the laying ship 10, and tenses the submarine cable 50 drawn out from the laying ship 10.

The sheave 30 is provided on the stern of the laying ship 10, and guides the submarine cable 50 and the submarine repeating apparatuses 60 drawn out from the laying ship 10.

When the seafloor is at a shallow sea, the submarine-cable embedding machine 40 is submerged onto the seafloor, and is slid on the seafloor by being hauled by the laying ship 10 so that the submarine-cable embedding machine 40 digs a groove, leads the submarine cable 50 and the submarine repeating apparatuses 60 into the groove, and then fills up the groove. The submarine cable 50 and the submarine repeating apparatuses 60 are buried in the seafloor so that a fishing net etc. is not caught on the submarine cable 50 and the submarine repeating apparatuses 60. As shown in FIG. 3, the submarine-cable embedding machine 40 comprises a bell mouth 41 in front, and a plurality of rollers 42–1 to 42-*n* and 43–1 to 43-*n* aligned horizontally from the bell mouth 41 in a direction A2. The rollers 42–1 to 42-*n* and 43–1 to 43-*n* oppose each other in vertical directions, respectively. The rollers 42–1 to 42-*n* and 43–1 to 43-*n* are movable vertically, and are energized in directions nearing to each other by oil hydraulic mechanisms (conveniently represented by springy members in FIG. 2B) 44 and 45.

In the operation of laying a submarine cable, the submarine cable 50 and the submarine repeating apparatuses 60 are moved as follows. First, the submarine cable 50 and the submarine repeating apparatuses 60 are transferred in the laying ship 10, and are guided between the rubber tires 21 and 22 of the linear cable engine device 20, whereby the submarine cable 50 drawn out from the laying ship 10 is provided with a tension T. The submarine cable 50 provided with the tension T is guided by the sheave 30 out of the laying ship 10 into seawater down to a seafloor, and is laid on the seafloor.

In a case of a shallow sea, the submarine cable 50 drawn out from the laying ship 10 is guided along the bell mouth 41 into the submarine-cable embedding machine 40, as shown in FIG. 3, and then is guided by the rollers 42–1 to 42-*n* and 43–1 to 43-*n* into the groove dug in the seafloor by the submarine-cable embedding machine 40.

As described above, in the course of the submarine repeating apparatuses 60 being transferred in the laying ship 10 and being led out of the laying ship 10 into the seawater down to the seafloor to be laid thereon, the submarine repeating apparatuses 60 pass a plurality of curved portions, and also go in and through the linear cable engine device 20, go over the sheave 30, and finally go in and through the submarine-cable embedding machine 40.

The submarine repeating apparatuses 60 are required to be easy to lay, i.e., to have a structure that allows a smooth operation of laying a submarine cable free from interruptions. Specifically, the submarine repeating apparatuses 60 are required to have a structure that avoids getting caught in the course of the operation of laying a submarine cable.

Additionally, when the submarine repeating apparatuses 60 get caught in the linear cable engine device 20, it is executable to cope with the caught-up submarine repeating apparatuses 60, because the linear cable engine device 20 is placed on the laying ship 10. However, when the submarine repeating apparatuses 60 get caught in the submarine-cable embedding machine 40, it is difficult to handle the caught-up submarine repeating apparatuses 60, because the submarine-cable embedding machine 40 is undersea. Therefore, it is especially important that the submarine repeating apparatuses 60 do not get caught in the submarine-cable embedding machine 40.

In the above-mentioned operation of laying a submarine cable, the bell mouth 41 has a function of guiding the submarine cable 50 and the submarine repeating apparatuses 60 along a guiding surface 41*b* on the upper part of the bell mouth 41 into the submarine-cable embedding machine 40. The bell mouth 41 has so predetermined a shape that the submarine repeating apparatuses 60 do not get caught thereby as long as the submarine cable 50 and the submarine repeating apparatuses 60 slide on the guiding surface 41*b* of the bell mouth 41. Additionally, a roller 41*a* is provided at a corner of the lower part of the bell mouth 41. The roller 41*a* supports the submarine repeating apparatus 60 entering the bell mouth 41, and revolves as the submarine repeating apparatus 60 transfers so that the submarine repeating apparatus 60 enters the submarine-cable embedding machine 40 smoothly.

2. Description of the Related Art

FIG. 4 shows a conventional submarine repeating apparatus 80. The submarine repeating apparatus 80 comprises a cylindrical body 81 in the center incorporating electronic components and optical components, and conical boots 84 and 85 at both ends. The body 81 comprises cylindrical joint rings 82 and 83 overhanging at both ends of the body 81. Ends of arm portions 86 extending from the boots 84 and 85 are connected with the joint rings 82 and 83 by gimbal joints 87, respectively. A bellows 88 covers between the boot 84 and the joint ring 82, and a bellows 89 covers between the boot 85 and the joint ring 83. The boots 84 and 85 can be bent freely in any direction with respect to the body 81 so that the operation of laying a submarine cable can be performed smoothly.

The arm portions 86 are necessary for the boots 84 and 85 to be bent freely in any direction with respect to the body 81.

The submarine repeating apparatus 80 is as heavy as approximately 500 kg. One of the boots 84 and 85 alone is as heavy as approximately 50 kg.

As shown in FIG. 2A, the cable guides 27 and 28 of the linear cable engine device 20 are provided so as to prevent the boot 84 carried out from between the rubber tires 21-3 and 22-3 from bending right and left in the direction Y1–Y2.

A space 90 is formed between each of the bellows 88 and 89 and the arm portion 86. Therefore, when the boot 84 carried out from between the rubber tires 21-3 and 22-3 slides between the cable guides 27 and 28 through, followed by the bellows 88 arriving between the cable guides 27 and 28, the cable guides 27 and 28 crush the bellows 88, and intrude into the space 90. When the cable guides 27 and 28 intrude deep into the space 90, an end surface of the joint ring 82 collides with the cable guides 27 and 28 such that the submarine repeating apparatus 80 may troublesomely get caught in the linear cable engine device 20.

Also in the submarine-cable embedding machine 40, as shown in FIG. 3, the rollers 42 and 43 may bend and crush the bellows 88, and intrude into the space 90, and the end surface of the joint ring 82 collides with the rollers 42 and 43 such that the submarine repeating apparatus 80 may troublesomely get caught in the submarine-cable embedding machine 40.

In accordance with the recent increase in communications traffic, there has been a trend in the conventional submarine repeating apparatus 80 that the difference between the diameters of the body 81 and the boot 84 becomes larger so as to increase the likelihood of causing the above-mentioned troubles.

Additionally, when the seawater or the seafloor is in bad conditions, or when the laying ship 10 fails to properly control the submarine-cable embedding machine 40, the submarine cable 50 drawn out from the laying ship 10 into the seawater wavers so as to cause the submarine repeating apparatus 80 to waver unstably at a point immediately before entering the submarine-cable embedding machine 40 as indicated by a double dashed chain line in FIG. 3; thereby, the submarine repeating apparatus 80 departs from the guiding surface 41*b* of the bell mouth 41 as shown in FIG. 5. In FIG. 5, large gaps 200 and 201 are created between the guiding surface 41*b* of the bell mouth 41 and the submarine repeating apparatus 80. When the submarine repeating apparatus 80 wavers unstably and departs from the guiding surface 41*b* of the bell mouth 41 so as to create the large gaps 200 and 201 as shown in FIG. 5, the end surface of the joint ring 82 draws near to the roller 41*a* provided at the corner of the lower part of the bell mouth 41 of the submarine-cable embedding machine 40, and collides with this roller 41*a*, whereupon the gimbal joint 87 nips the roller 41*a* such that the submarine repeating apparatus 80 may troublesomely get caught at the bell mouth 41 of the submarine-cable embedding machine 40.

SUMMARY OF THE INVENTION

It is a general object of the present invention to provide an improved and useful submarine apparatus in which the above-mentioned problems are eliminated.

A more specific object of the present invention is to provide a submarine apparatus provided along a submarine cable which apparatus can avoid getting caught in the course of laying the submarine cable.

In order to achieve the above-mentioned objects, there is provided according to one aspect of the present invention a submarine apparatus laid undersea by a submarine-cable laying device, the apparatus comprising:

a cylindrical body performing a signal processing;

a conical boot arranged at each of both ends of the body so as to fix an end of a submarine cable, a diameter of an end of the boot being smaller than a diameter of each of both ends of the body;

a gimbal joint provided on each of both ends of the body so as to support an end of an arm portion extending from the boot; and a spacer mechanism provided between the body and the boot so as to occupy a part of a space therebetween.

According to the present invention, in the course of laying a submarine cable, the spacer mechanism bears a part of the submarine-cable laying device so as to prevent the part from entering deep into the space between the body and the boot.

Additionally, in the submarine apparatus according to the present invention, the spacer mechanism may include a plurality of circular spacers each having a central opening so as to be arranged loosely around the arm portion, each of the spacers having a diameter equal to or smaller than the diameter of each of both ends of the body.

According to the present invention, since the spacers are arranged loosely around the arm portion, the spacers can be moved in an axial direction of the arm portion, and can be inclined easily with respect to the arm portion. Thereby, the spacer mechanism puts no restriction to the bending of the boot with respect to the body.

The inclined spacers narrow the opening width of the space between the body and the boot, or partition the space into two spaces each having a narrowed opening width. These narrowed opening widths prevent the part of the submarine-cable laying device from entering deep into the spaces.

The inclined spacers form an oblique plane that makes it easy for the part of the submarine-cable laying device to get out of the spaces.

Besides, since each of the spacers has a circular shape, whatever diametrical direction the submarine apparatus is positioned around the axis thereof, the spacers 121 to 123 function correctly with respect to the part of the submarine-cable laying device.

Additionally, in the submarine apparatus according to the present invention, the spacer mechanism may include a plurality of circular spacers each having a central opening so as to be arranged loosely around the arm portion, the spacers having different diameters decreasing toward the boot, each of the diameters being equal to or smaller than the diameter of each of both ends of the body.

According to the present invention, the spacers arranged in the order of diameter form a gently inclined plane with respect to the arm portion, compared to the spacers having a same diameter.

Additionally, in the submarine apparatus according to the present invention, each of the spacers may have a rib around the central opening.

According to the present invention, the rib creates a gap between the adjacent spacers. The gap alleviates a friction between the adjacent spacers so that the spacers can be smoothly inclined.

Additionally, in the submarine apparatus according to the present invention, each of the spacers may comprise a pair of half members combined with each other.

According to the present invention, each of the spacers can be assembled easily by combining the pair of the half members.

Other objects, features and advantages of the present invention will become more apparent from the following detailed description when read in conjunction with the accompanying drawings.

BRIEF DESCRIPTION OF THE DRAWINGS

FIG. 9A shows a structure of a spacer shown in FIG. 7 and FIG. 8;

FIG. 9B shows an overturned half of the spacer shown in FIG. 9A;

DETAILED DESCRIPTION OF THE PREFERRED EMBODIMENTS

A description will now be given, with reference to the drawings, of embodiments according to the present invention.

Figure 6:
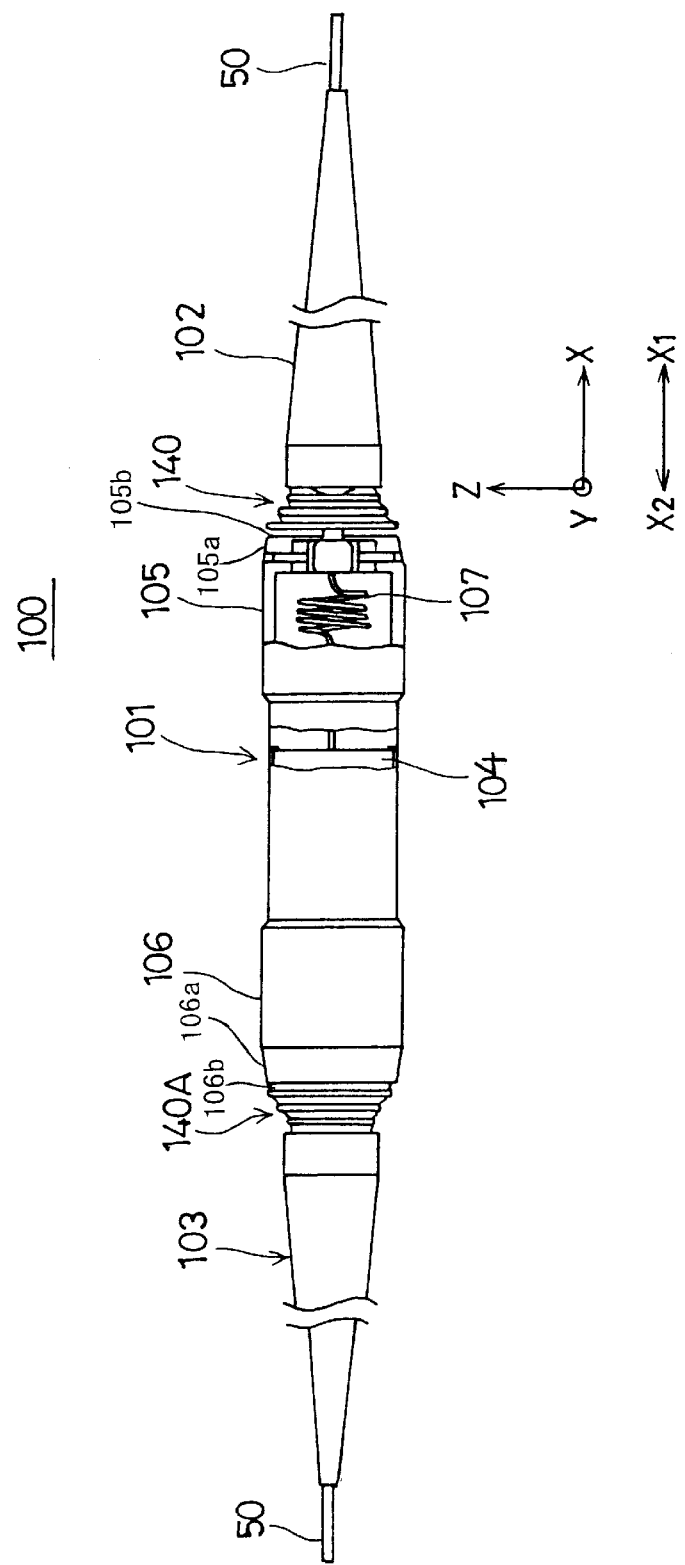
FIG. 6 shows a submarine repeating apparatus according to an embodiment of the present invention.
Figure 7:
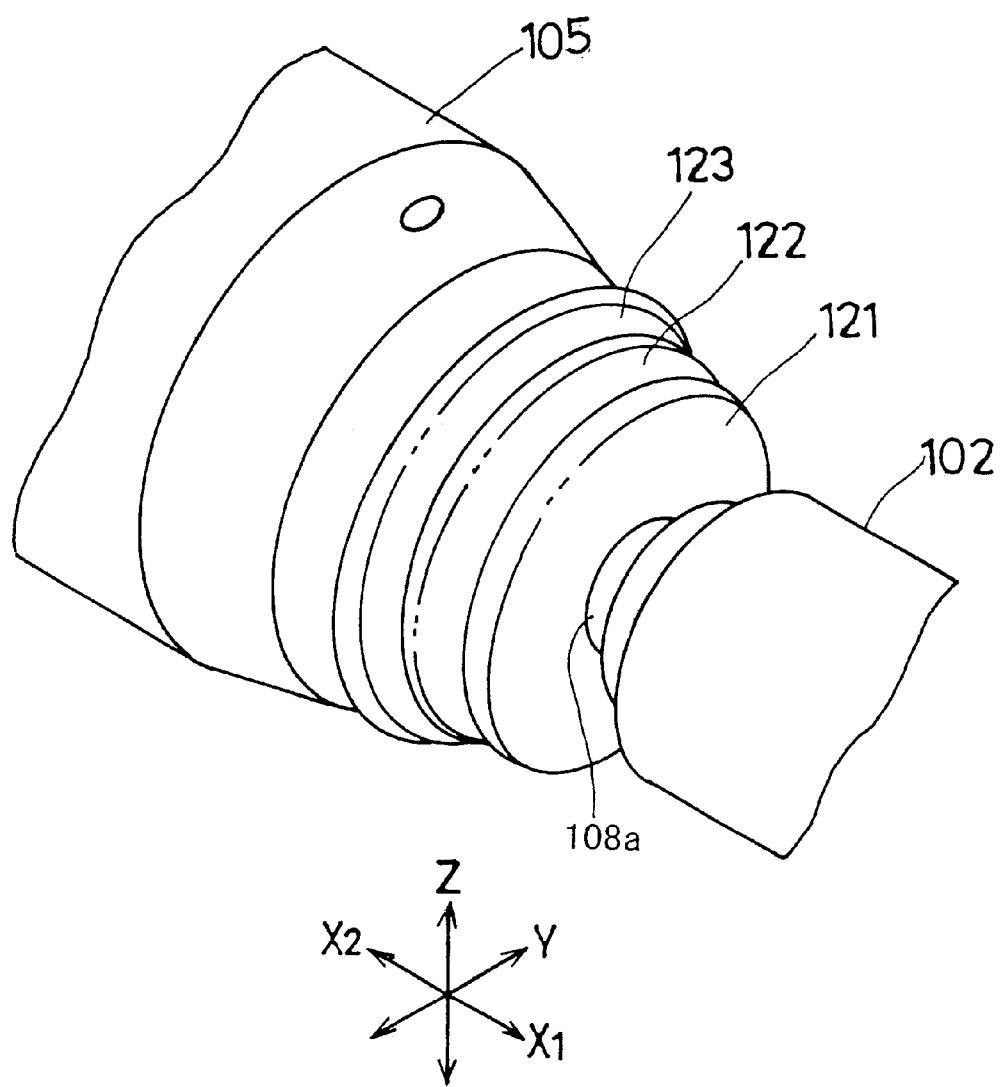
FIG. 7 is a perspective view of a joint part joining a boot with a body shown in FIG. 6.

FIG. 6 is a side view of a submarine repeating apparatus 100 according to an embodiment of the present invention. The submarine repeating apparatus 100 comprises a cylindrical body 101 in the center, and conical boots 102 and 103 at both ends. Each of the boots 102 and 103 is fixed to an end of the submarine cable 50, i.e., the submarine cable 50 extends from each of the boots 102 and 103. In FIG. 6, X indicates a longitudinal direction of the submarine repeating apparatus 100, Z indicates a vertical direction of the submarine repeating apparatus 100 as viewed in FIG. 6, and Y indicates a direction perpendicular to the view of FIG. 6.

The body 101 comprises a unit 104 incorporating electronic components and optical components, and cylindrical joint rings 105 and 106 at both ends of the unit 104. Each of the joint rings 105 and 106 contains a helically wound cable 107 drawn out from the unit 104. The joint rings 105 and 106 have tapering peripheral surfaces 105a and 106a at respective ends thereof, and have end surfaces 105b and 106b on the respective ends thereof.

As shown in FIG. 7 to FIG. 9B, an end of a cylindrical arm portion 108a extending from an end of the boot 102 is connected with the joint ring 105 by a gimbal joint 110.

The gimbal joint 110 comprises a gimbal ring 111, pins 112, a gimbal 113, and pins 114.

The gimbal ring 111 is so supported by the pins 112 to the joint ring 105 that the gimbal ring 111 can be revolved in a range of approximately 90 degrees around the axis Z. The gimbal 113 is formed by the arm portion 108a and a substantially spherical portion 108b at the end of the arm portion 108a. The spherical portion 108b is so supported by the pins 114 within the gimbal ring 111 that the gimbal 113 can be revolved in a range of approximately 90 degrees around the axis Y with respect to the gimbal ring 111. Thus, the boot 102 can be bent with respect to the body 101.

A spacer mechanism 140 is provided between the boot 102 and the joint ring 105 so as to prevent such elements as rollers from intruding into a space 126 therebetween. The spacer mechanism 140 does not prevent the boot 102 from bending with respect to the body 101.

Next, a description will be given of this spacer mechanism 140.

The spacer mechanism 140 is loosely set around the cylindrical arm portion 108a with a play therebetween. The spacer mechanism 140 comprises first to third circular spacers 121 to 123 arranged in this order from the boot 102. Each of the spacers 121 to 123 has as small a thickness t as approximately 10 mm.

The first to third spacers 121 to 123 fill the space 126 having an opening width W1 in a direction X between the boot 102 and the joint ring 105. The first to third spacers 121 to 123 are independent from each other, and are inclined in a same direction, as described hereinafter. The first to third spacers 121 to 123 are made of a beryllium-copper alloy.

The first to third spacers 121 to 123 have openings 121a to 123a, respectively, at the center thereof. A diameter D10 of the openings 121a to 123a is larger than a diameter D11 of the arm portion 108a by Δa. Gaps 124 are formed between the first to third spacers 121 to 123 and the arm portion 108a so as to allow the first to third spacers 121 to 123 to incline.

At this point, it is conceivable to provide a single thick spacer having a shape of a truncated cone, in place of the first to third circular spacers 121 to 123. However, the single thick truncated-cone spacer cannot be inclined as easily as the independent first to third circular spacers 121 to 123.

Figure 13:
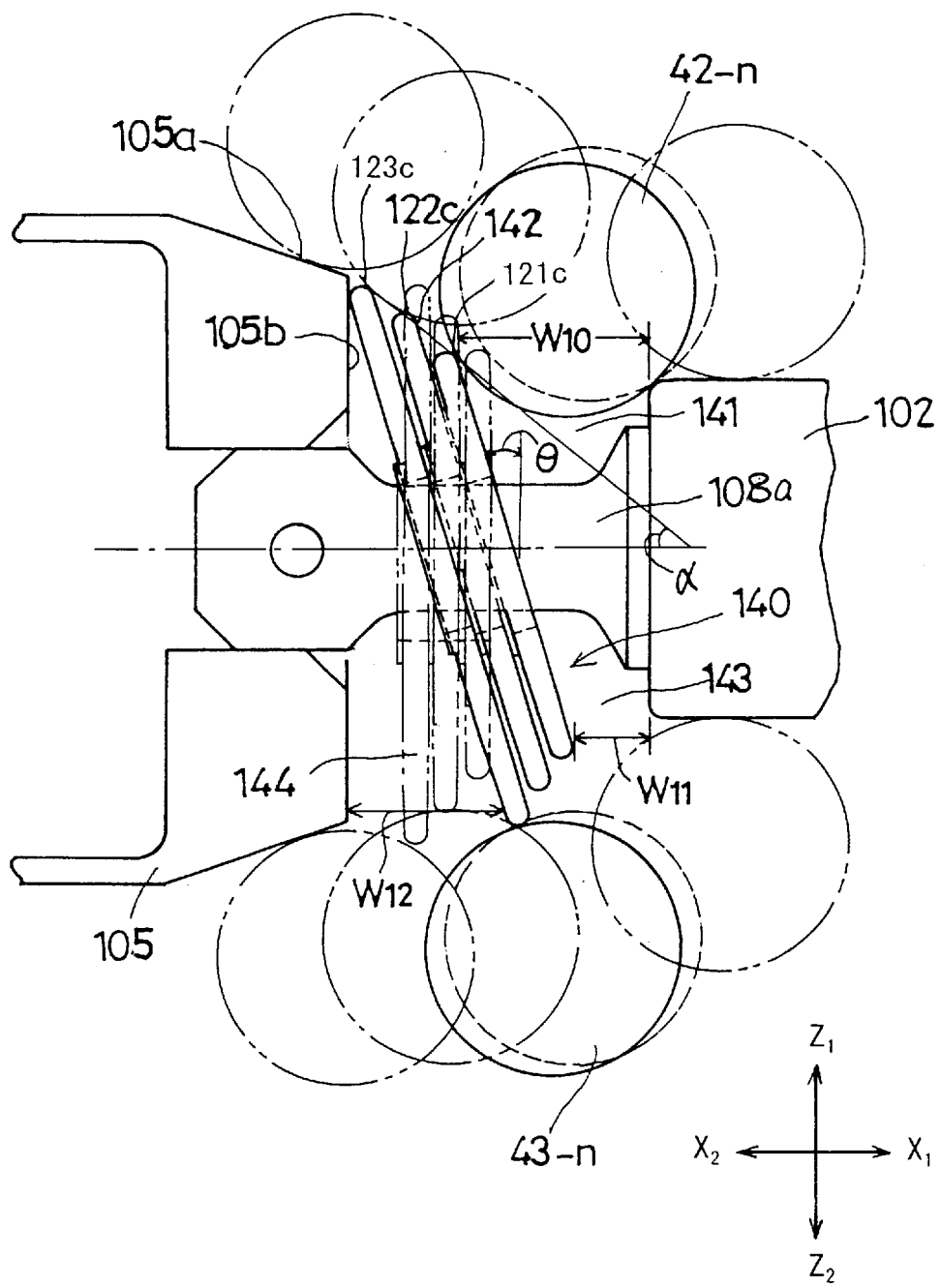
FIG. 13 illustrates functions of the spacer mechanism shown in FIG. 8 and rollers shown in FIG. 3 when the submarine repeating apparatus shown in FIG. 6 passes through the submarine-cable embedding machine shown in FIG. 3.

The first to third spacers 121 to 123 also have annular ribs 121b to 123b around the openings 121a to 123a, respectively. The annular ribs 121b to 123b each project in a direction X2 so as to secure gaps 125 between the adjacent first to third spacers 121 to 123. The gaps 125 prevent the first to third spacers 121 to 123 from contacting each other closely; this alleviates frictions between the adjacent first to third spacers 121 to 123. Thereby, the first to third spacers 121 to 123 can smoothly incline in a same direction (as shown in FIG. 13), in which spaces 143 and 144 having substantially equal opening widths W11 and W12 are formed at both sides of the inclined first to third spacers 121 to 123. The gaps 125 contribute to making the first to third spacers 121 to 123 less heavy as a whole; this facilitates an assembling process of the spacer mechanism 140.

The first to third spacers 121 to 123 have diameters D1 to D3, respectively. The end of the boot 102 has a diameter Db. The end surface 105b of the joint ring 105 has a diameter Dm.

The diameter Dm is substantially equal to or larger than the diameter D3. The diameter D1 is substantially equal to or larger than the diameter Db. The diameter D2 is larger than the diameter D1 and is smaller than the diameter D3. In short, there is a relationship represented by an expression Dm>=D3>D2>D1>=Db.

In this relationship, the diameters D1 to D3 of the first to third spacers 121 to 123 have a relationship represented by an expression D3>D2>D1>.

Additionally, the first to third spacers 121 to 123 have round-edged outer peripheral surfaces 121c to 123c, respectively.

The spacer 121 comprises a pair of semicircular halves 130 and 131, as shown in FIG. 9A. The spacer 121 is set around the arm portion 108a by combining theses semicircular halves 130 and 131 around the arm portion 108a and fixing the semicircular halves 130 and 131 by screws 132 and 133 from both sides.

Figures 10A, 10B:
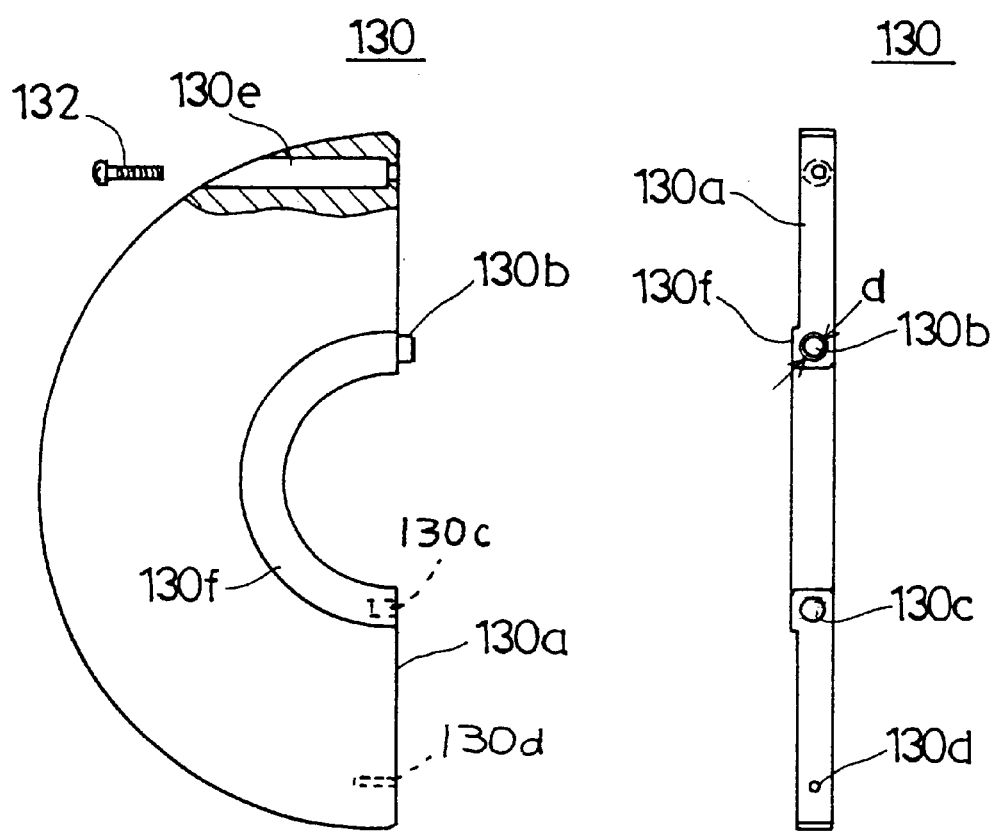
FIG. 10A is a front view of a half of the spacer shown in FIG. 9A.
FIG. 10B is a center-side view of the half of the spacer shown in FIG. 9A.

As shown in FIG. 9A, FIG. 10A and FIG. 10B, a pin 130b, a hole 130c and a screw hole 130d are formed in a side surface 130a of the half 130 facing a side surface 131a of the half 131. The half 130 also has a hole 130e into which the screw 132 is inserted. On the other hand, a pin 131b, a hole 131c and a screw hole 131d are formed in the side surface 131a of the other half 131 facing the side surface 130a of the half 130. The half 131 also has a hole 131e into which the screw 133 is inserted. In addition, the halves 130 and 131 have semicircular rib portions 130f and 131f around the center of the halves 130 and 131, respectively. The pins 130b and 131b are formed on wide parts of the side surfaces 130a and 131a corresponding to the rib portions 130f and 131f, respectively. A diameter d of the pins 130b and 131b is as large as approximately 8 mm. These thick pins 130b and 131b are inserted into the holes 131c and 130c, respectively, so that the spacer 121 has a large mechanical strength.

The halves 130 and 131 are combined only in a predetermined orientation by virtue of the pins 130b and 131b being inserted into the holes 131c and 130c, respectively.

Thus, when the half 131 is overturned as shown in FIG. 9B, the halves 130 and 131 cannot be combined falsely. Additionally, the halves 130 and 131 are positioned properly by the pins 130b and 131b being inserted into the holes 131c and 130c, respectively; thereby, the screws 132 and 133 can be fastened smoothly.

Besides, the halves 130 and 131 are rotationally symmetrical around an axis X.

Additionally, the boot 103 and the joint ring 106 shown in FIG. 6 are joined to each other in the symmetrical manner as the boot 102 and the joint ring 105 described above, in which a spacer mechanism 140A is provided between the boot 103 and the joint ring 106. Thus, a description thereof will be substantially the same as above.

Next, a description will be given of functions of the spacer mechanism 140 having the above-described structure.

Figure 11:
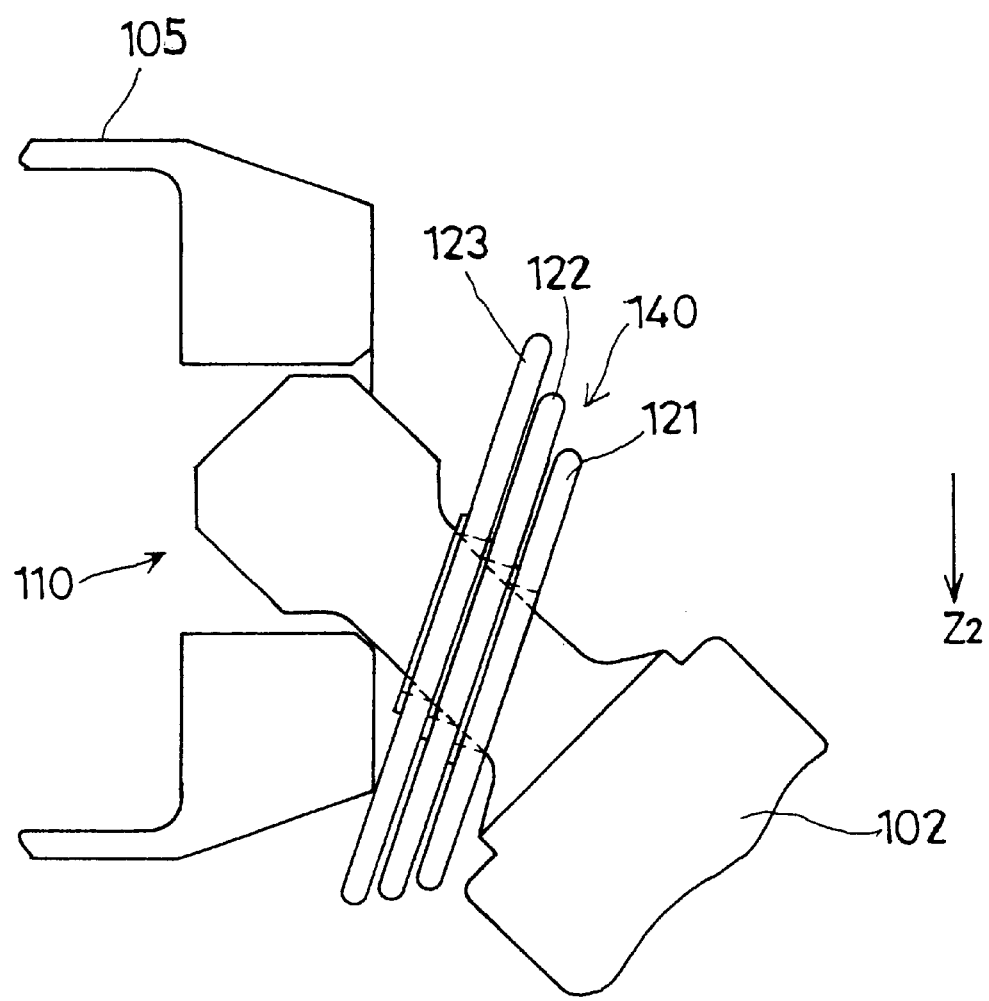
FIG. 11 shows a state of a spacer mechanism shown in FIG. 8 when the boot bends in a direction Z2 with respect to the body.

(i) When the Boot 102 Bends with Respect to the Body 101:

FIG. 11 shows a state of the spacer mechanism 140 when the boot 102 bends in a direction Z2 with respect to the body 101. As the boot 102 bends lower in the direction Z2, the third spacer 123 contacts the joint ring 105, whereupon the third spacer 123 is relatively pushed by the joint ring 105 so as to be revolved counterclockwise with respect to the arm portion 108a. The third spacer 123 being revolved counterclockwise pushes the first and second spacer 121 and 122 so that the first and second spacer 121 and 122 are also revolved counterclockwise with respect to the arm portion 108a. At this point, the first to third spacers 121 to 123 are inclined with respect to the arm portion 108a. In this course, the first to third spacers 121 to 123 put no restriction to the bending of the boot 102. The first to third spacers 121 to 123 are in the state show in FIG. 11.

Figure 12:
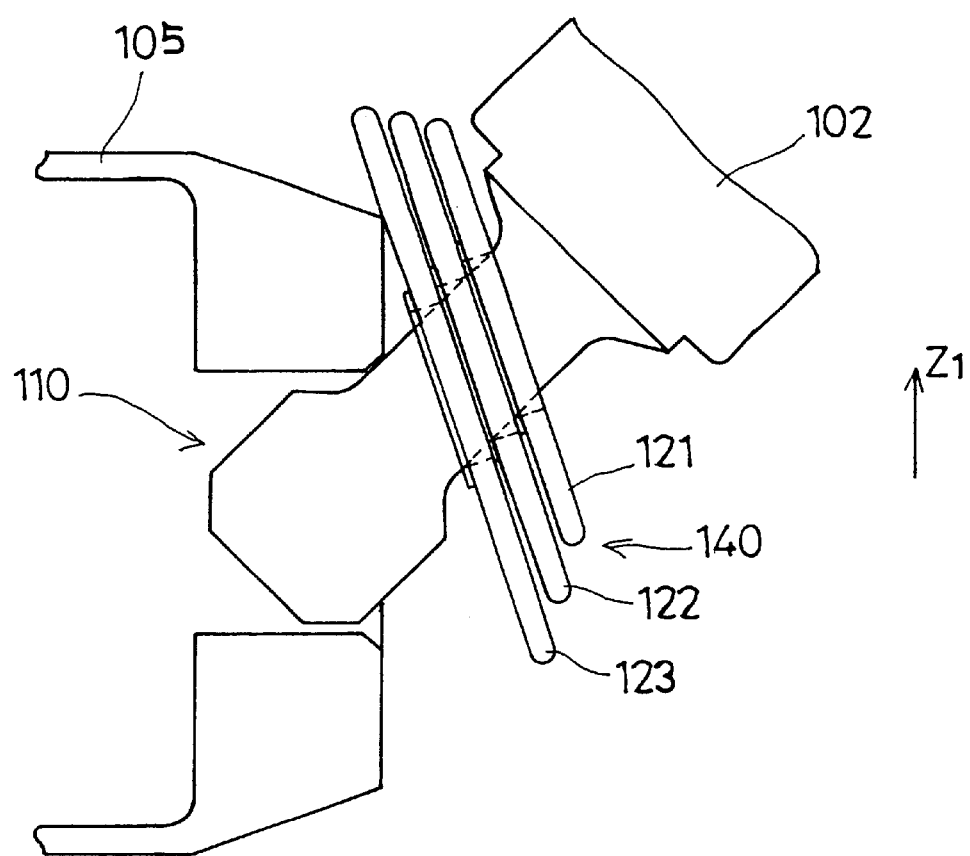
FIG. 12 shows a state of the spacer mechanism shown in FIG. 8 when the boot bends in a direction Z1 with respect to the body.

FIG. 12 shows a state of the spacer mechanism 140 when the boot 102 bends in a direction Z1 with respect to the body 101. The first to third spacers 121 to 123 are revolved clockwise with respect to the arm portion 108a, and consequently are inclined with respect to the arm portion 108a.

Figure 3:
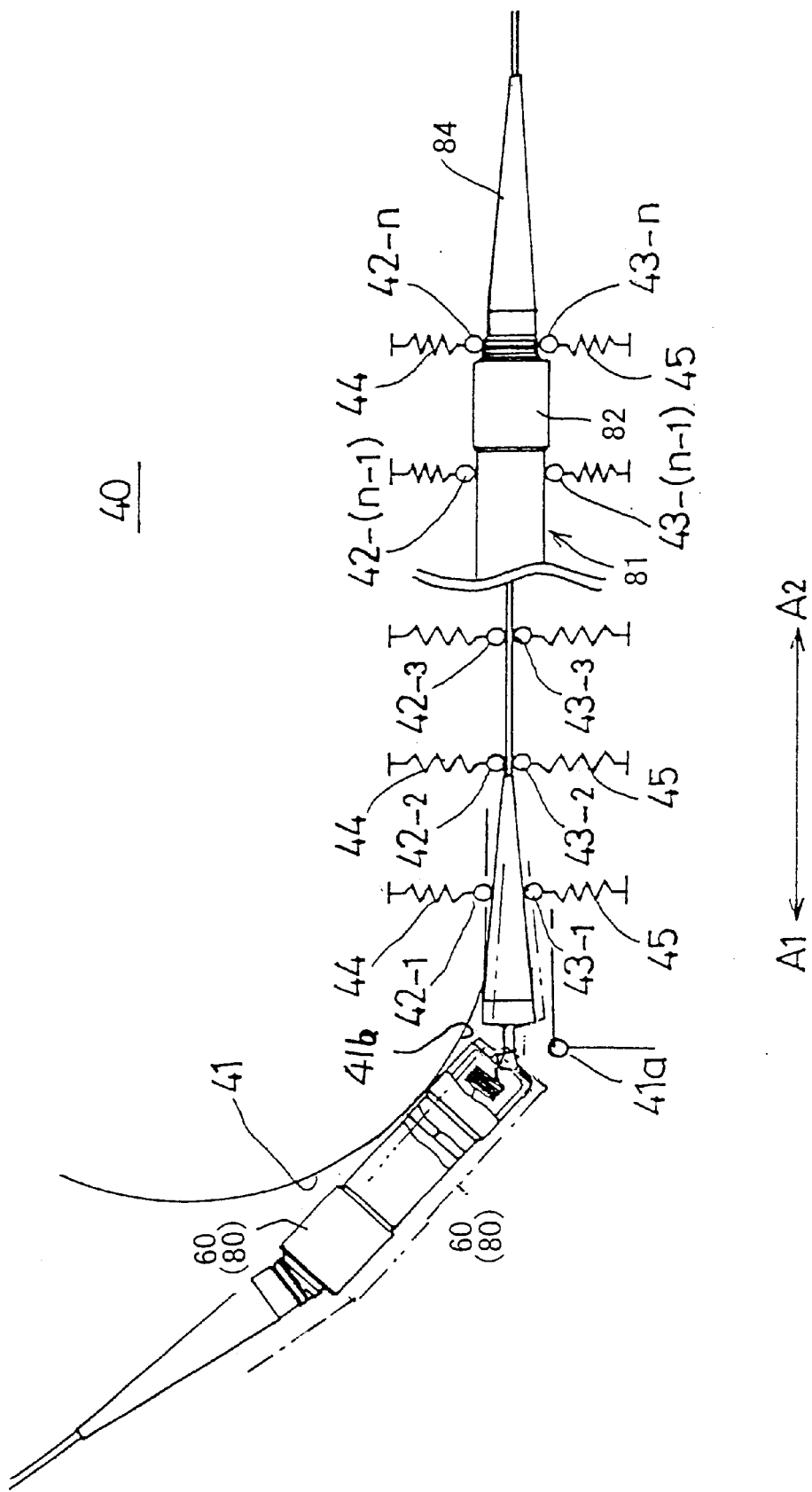
FIG. 3 is a side view of a submarine-cable embedding machine.
Figure 4:
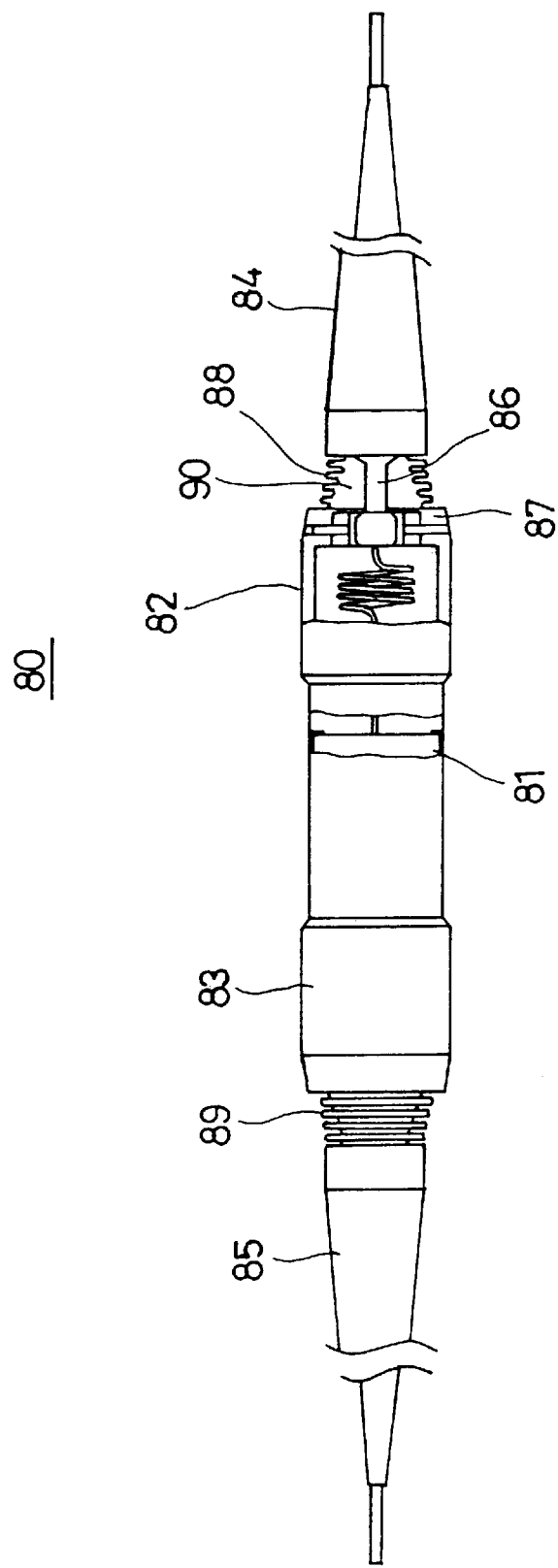
FIG. 4 shows a conventional submarine repeating apparatus.
Figure 5:
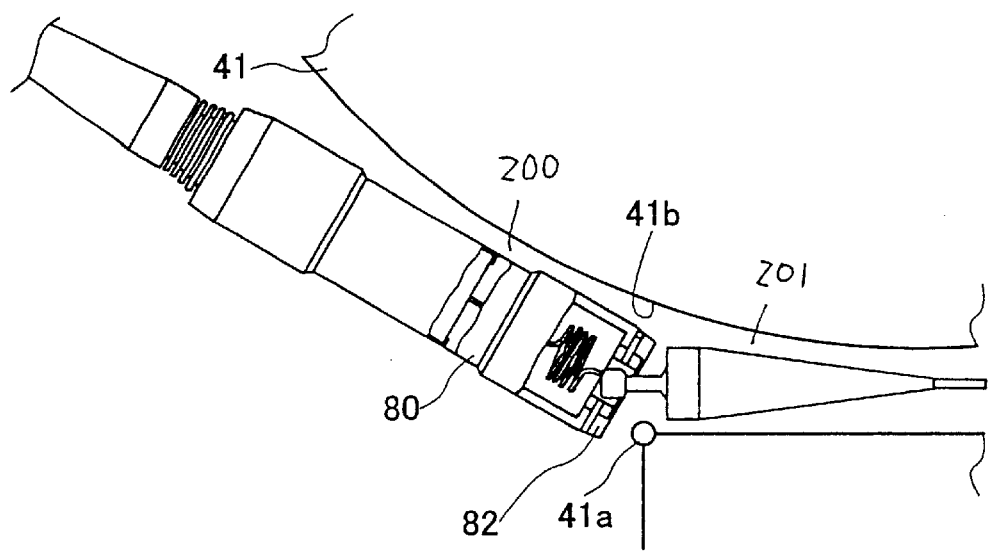
FIG. 5 illustrates an example of an unstable state of the submarine repeating apparatus shown in FIG. 4.
Figure 14:
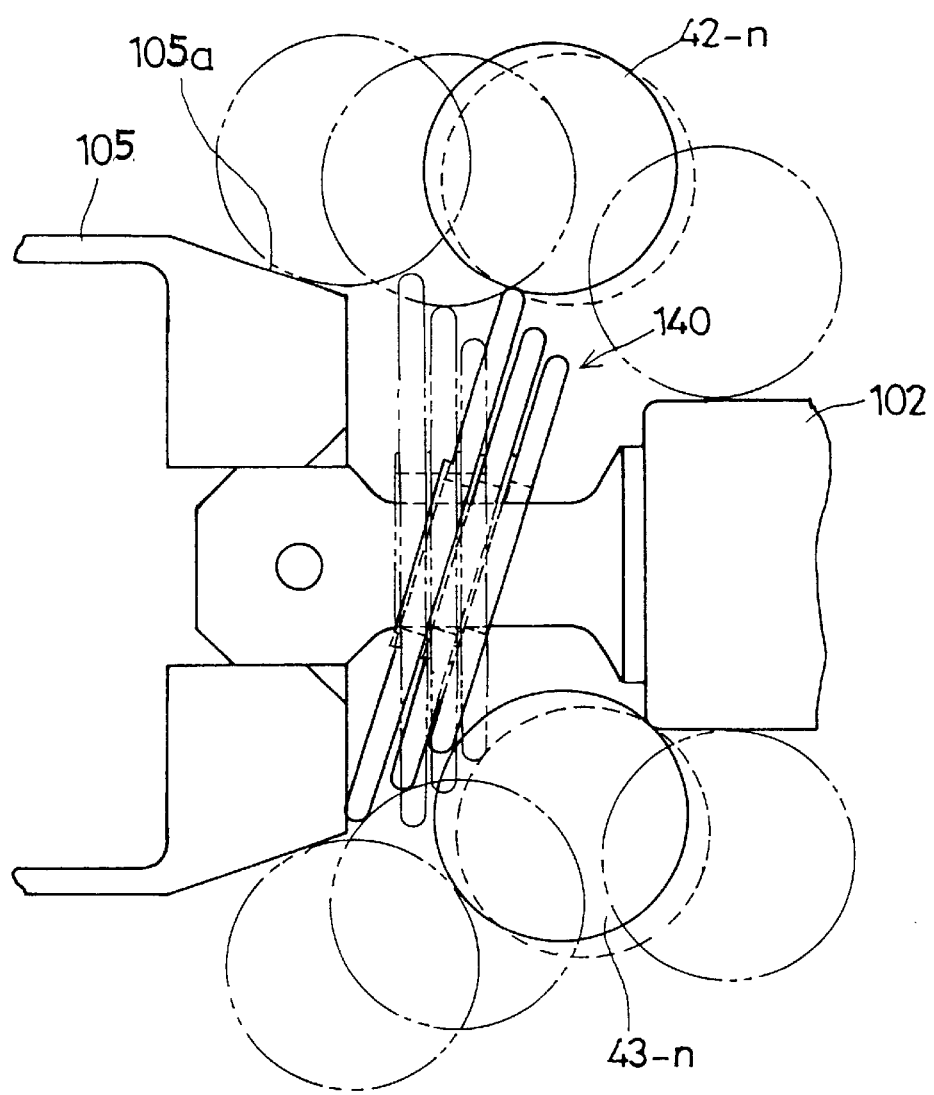
FIG. 14 illustrates another example of functions of the spacer mechanism and the rollers when the submarine repeating apparatus passes through the submarine-cable embedding machine.

(ii) When the Spacer Mechanism 140 Passes Between the Rollers 42 and 43:

The submarine repeating apparatus 100 shown in FIG. 6 enters the submarine-cable embedding machine 40 shown in FIG. 3, and is carried in a direction X1 (the direction A2 in FIG. 3). Then, when the spacer mechanism 140 faces the upper and lower rollers 42-n and/or 43-n, the first to third spacers 121 to 123 are relatively pushed in the direction X2 by the rollers 42-n and/or 43-n, and are shifted in the direction X2 as indicated by broken lines in FIG. 13 and FIG. 14. Subsequently, the first to third spacers 121 to 123 are revolved counterclockwise so as to be inclined at an angle θ as shown in FIG. 13, or are revolved clockwise so as to be inclined at the angle θ as shown in FIG. 14. The first to third spacers 121 to 123 are inclined to the extent that a part of the third spacer 123 contacts the end surface 105b of the joint ring 105, while being shifted in the direction X2.

In a state shown in FIG. 13, a substantially V-shaped space 141 is formed above the arm portion 108a in the direction Z1. An opening width W10 of the space 141 is smaller than the opening width W1 of the space 126 shown in FIG. 8. An oblique plane 142 is formed at a position near the space 141 in the direction X2 by the round-edged outer peripheral surfaces 121c to 123c of the first to third spacers 121 to 123 ranging in a direction between the direction X2 and the direction Z1. The plane 142 stretches to the tapering peripheral surfaces 105a of the joint ring 105. Due to the first to third spacers 121 to 123 being shifted and inclined, the plane 142 is gently inclined. The plane 142 is inclined with respect to a horizontal plane at as small an angle α as approximately 45 degrees.

Under the arm portion 108a in the direction Z2, the space 126 is partitioned into the two spaces 143 and 144 by the first to third spacers 121 to 123. Each of the opening width W11 of the space 143 and the opening width W12 of the space 144 is smaller than half the opening width W1 of the space 126.

Next, a description will be given of functions of the rollers 42-n and 43-n in the above-mentioned course.

In the following description, the rollers 42-n and 43-n are moved relatively in the direction X2.

When the roller 42-n comes to the end of the boot 102, the roller 42-n enters the space 141 as indicated by a solid line in FIG. 13. Then, the roller 42-n climbs the oblique plane 142 out of the space 141 as indicated by a double dashed chain line, and reaches the tapering peripheral surfaces 105a of the joint ring 105.

The roller 42-n climbs the oblique plane 142 out of the space 141 smoothly, firstly because the opening width W10 is smaller than the opening width W1 such that the roller 42-n does not enter deep into the space 141, and secondly because the plane 142 is gently inclined.

The roller 43-n uses the first to third spacers 121 to 123 as a steppingstone to get over the space 143 first and the space 144 next to reach the tapering peripheral surfaces 105a of the joint ring 105.

In a state shown in FIG. 14, the lower roller 43-n functions in the same manner as the roller 42-n shown in FIG. 13, and the upper roller 42-n functions in the same manner as the roller 43-n shown in FIG. 13.

Thus, the submarine repeating apparatus 100 passes through the submarine-cable embedding machine 40 smoothly without getting caught therein.

(iii) When the Spacer Mechanism 140 is Led Unstably into the Submarine-Cable Embedding Machine 40:

When the seawater or the seafloor is in bad conditions, or when the laying ship 10 fails to properly control the submarine-cable embedding machine 40, the submarine repeating apparatus 100 is led waveringly and unstably into the submarine-cable embedding machine 40. When the submarine repeating apparatus 100 is led waveringly and unstably into the submarine-cable embedding machine 40, the end surface 105b of the joint ring 105 may possibly collide with the roller 41a, whereupon the gimbal joint 110 may possibly nip the roller 41a.

Figure 15:
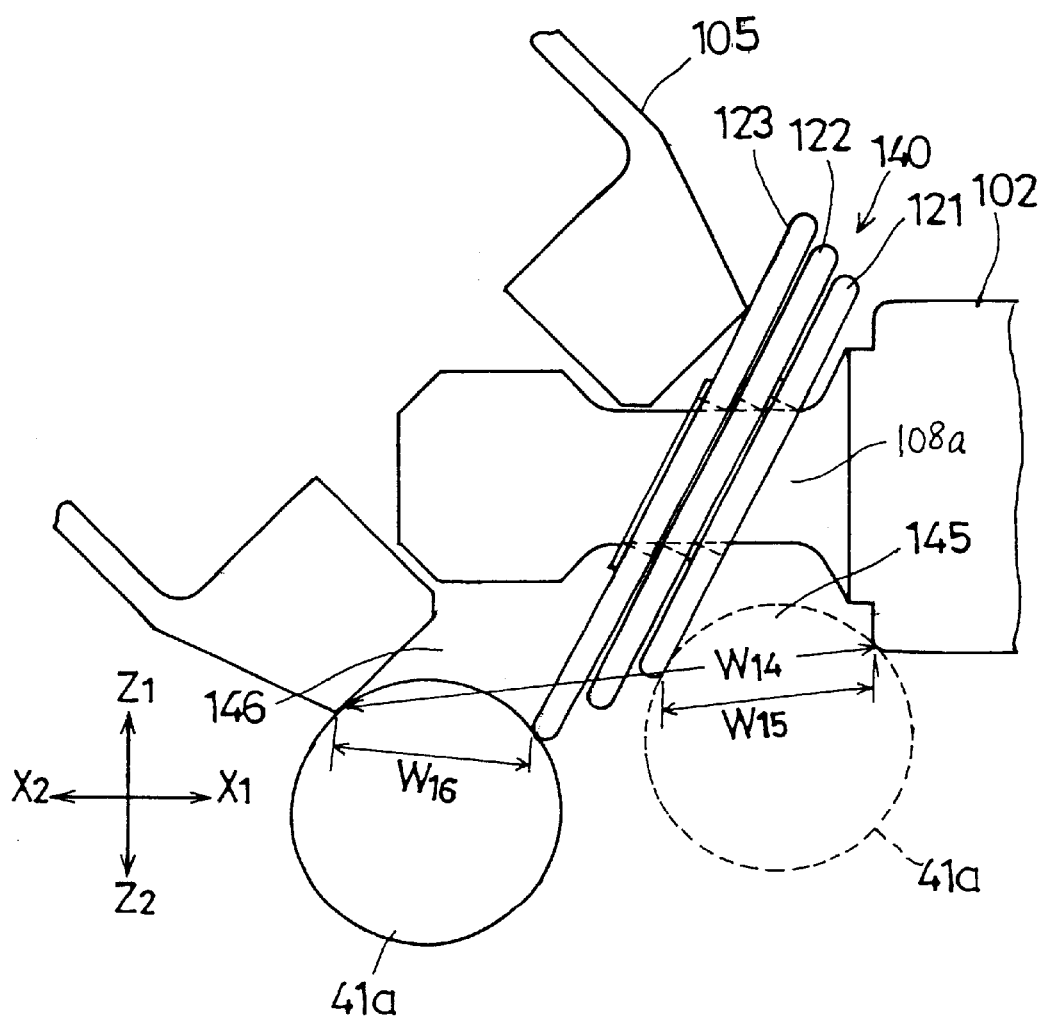
FIG. 15 shows a state of the submarine repeating apparatus led waveringly and unstably into the submarine-cable embedding machine.

FIG. 15 shows a wavering and unstable state of the submarine repeating apparatus 100. In FIG. 15, the boot 102 bends in the same direction with respect to the body 101 as in FIG. 12.

The first to third spacers 121 to 123 are revolved clockwise and inclined with respect to the arm portion 108a.

Figure 8:
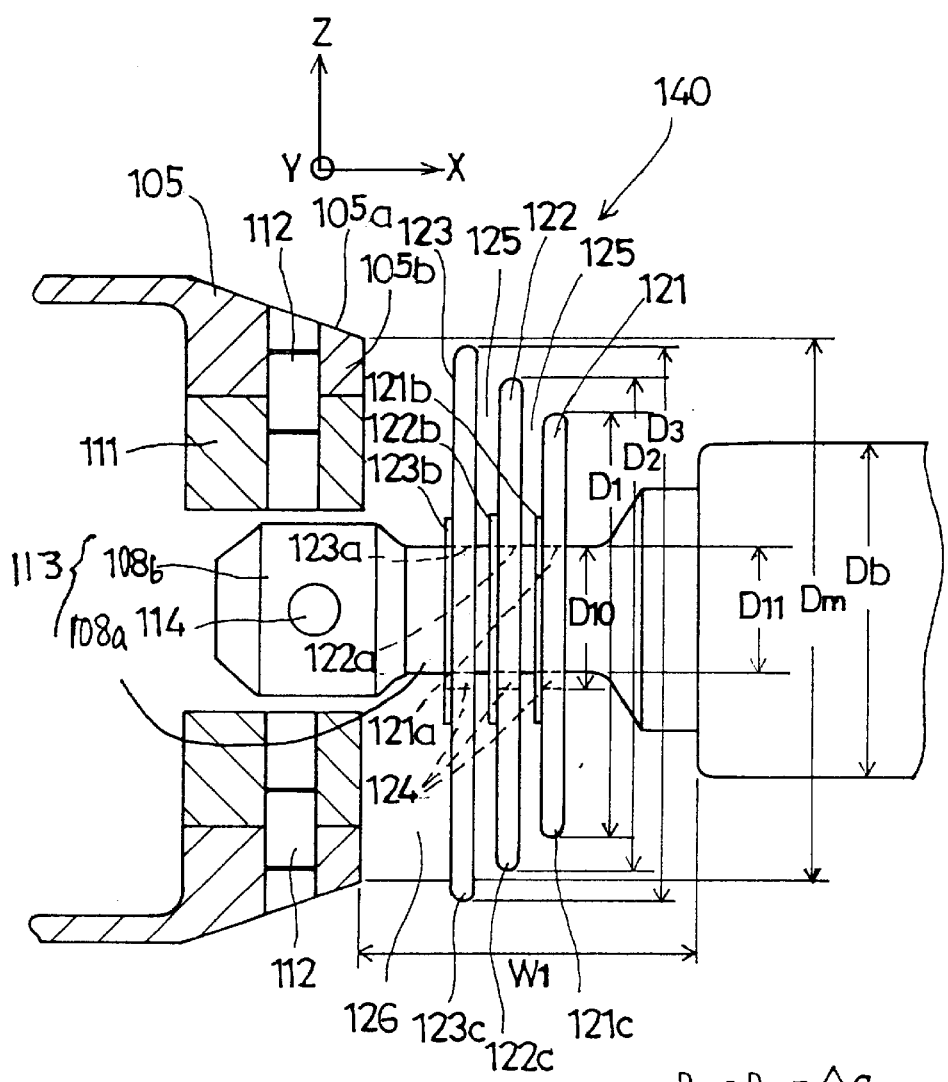
FIG. 8 is a side view of the joint part shown in FIG. 7.

Below the arm portion 108a in the direction Z2, a space between the end of the boot 102 and the end surface 105b of the joint ring 105 is expanded so as to have an opening width W14 approximately 1.5 times as large as the opening width W1 shown in FIG. 8. However, the expanded space is partitioned into two spaces 145 and 146 by the first to third spacers 121 to 123. Each of an opening width W15 of the space 145 and an opening width W16 of the space 146 is approximately half the opening width W1 of the space 126 shown in FIG. 8.

The roller 41a uses the first to third spacers 121 to 123 as a steppingstone to get over the space 145 first and the space 146 next to reach the tapering peripheral surfaces 105a of the joint ring 105.

Thus, even when the seawater or the seafloor is in bad conditions, or even when the laying ship 10 fails to properly control the submarine-cable embedding machine 40, the submarine repeating apparatus 100 is led smoothly into the submarine-cable embedding machine 40 without getting caught at the entrance thereof.

Figure 1:
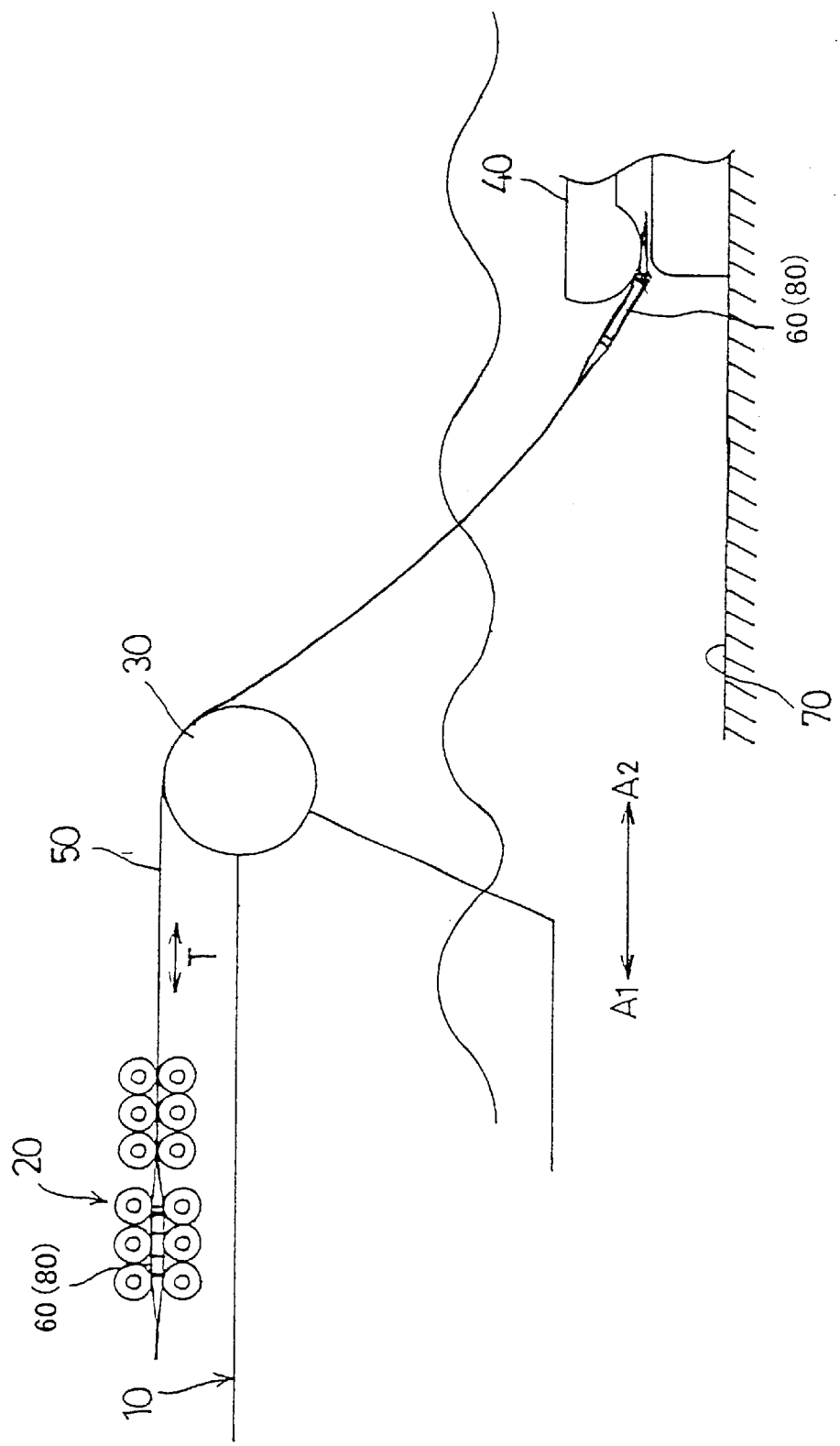
FIG. 1 illustrates an operation of laying a submarine cable.
Figure 2A:
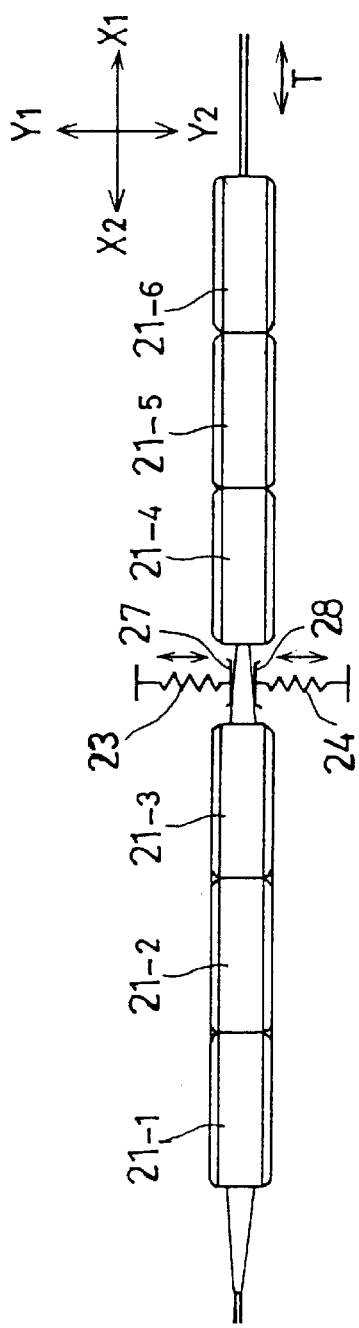
FIG. 2A is a plan view of a linear cable engine device shown in FIG. 1.
Figure 2B:
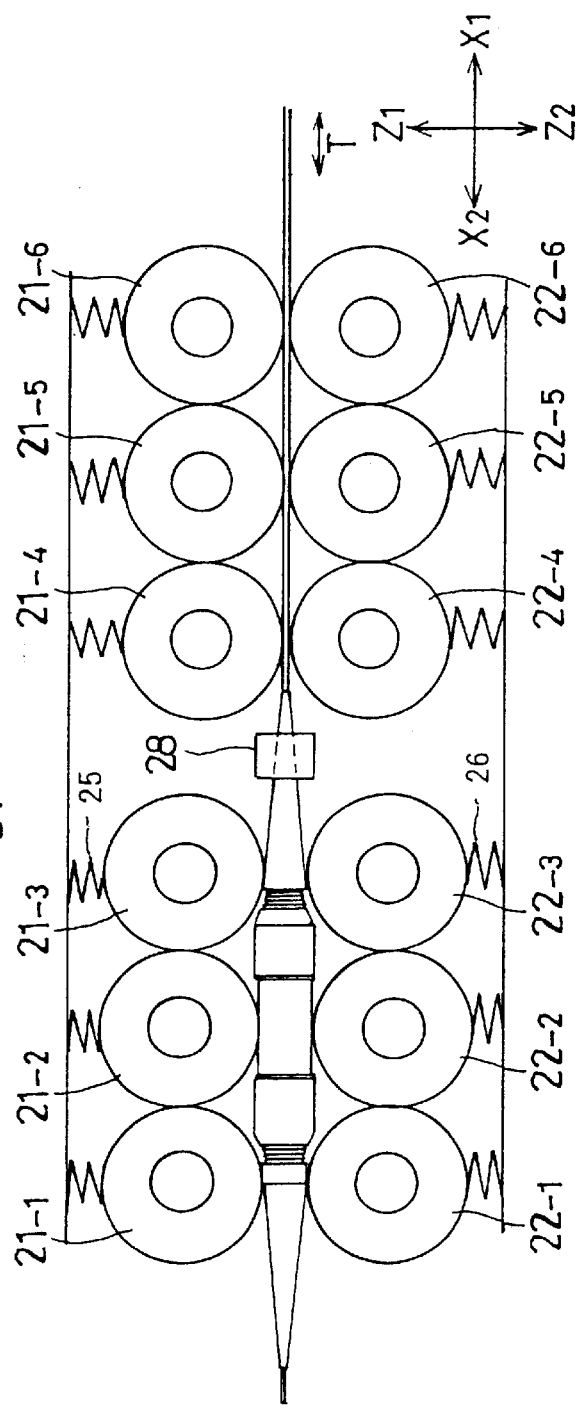
FIG. 2B is a side view of the linear cable engine device shown in FIG. 1.
Figure 16:
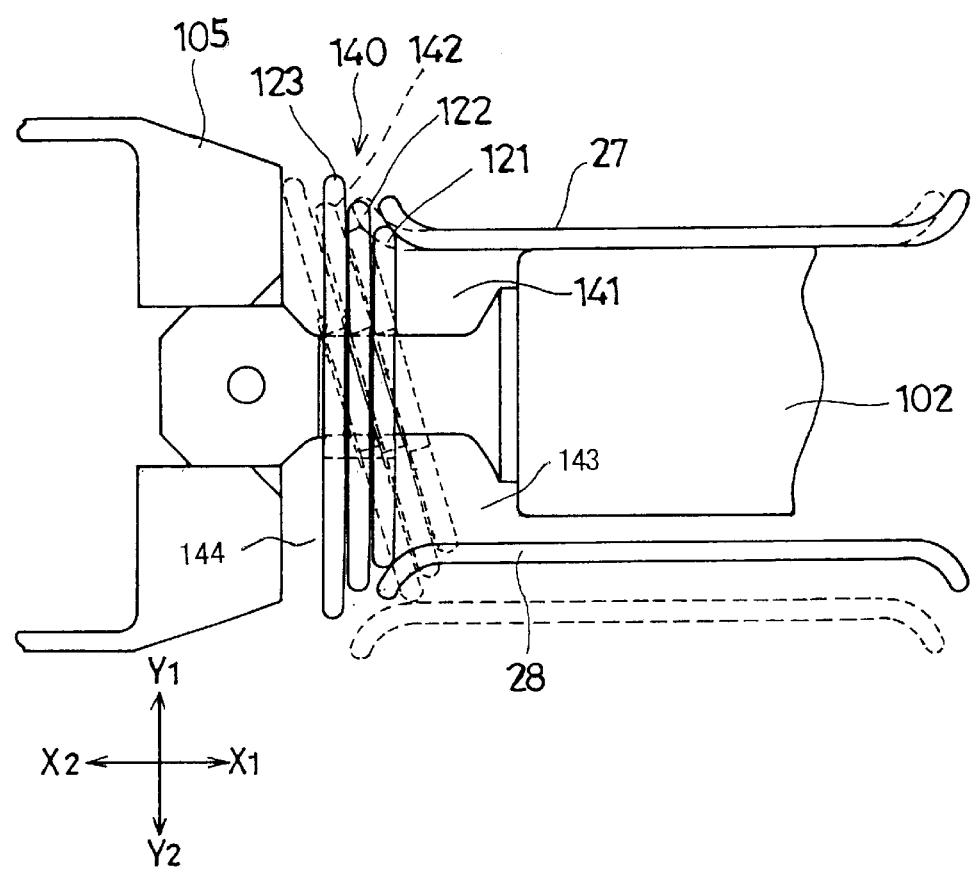
FIG. 16 illustrates functions of the spacer mechanism shown in FIG. 8 and cable guides shown in FIG. 2A and FIG. 2B when the submarine repeating apparatus shown in FIG. 6 passes through the linear cable engine device 20 shown in FIG. 2A and FIG. 2B.

(iv) When the Spacer Mechanism 140 Passes Between the Cable Guides 27 and 28:

When the submarine repeating apparatus 100 is carried in the linear cable engine device 20 shown in FIG. 2A and FIG. 2B, and then the spacer mechanism 140 faces the cable guides 27 and 28, the first to third spacers 121 to 123 are pushed relatively in the direction X2 by the cable guides 27 and 28, and are shifted in the direction X2 as indicated by solid lines in FIG. 16. Subsequently, the first to third spacers 121 to 123 are revolved counterclockwise so as to be inclined as indicated by broken lines in FIG. 16. In this state, an end of the spacer mechanism 140 forms the oblique plane 142. The cable guide 27 is relatively guided by the oblique plane 142 over the space 141 to reach the tapering peripheral surfaces 105a of the joint ring 105. The cable guide 28 is pushed by the inclined spacer mechanism 140 in a direction Y2, and then is relatively moved over the spaces 143 and 144 while being supported by the other end of the spacer mechanism 140 to reach the tapering peripheral surfaces 105a of the joint ring 105.

Additionally, even when the first to third spacers 121 to 123 are kept in the state indicated by the solid lines in FIG. 16, the cable guides 27 and 28 are relatively guided by peripheral parts of the first to third spacers 121 to 123 over the space 141 and the spaces 143 and 144 to reach the tapering peripheral surfaces 105a of the joint ring 105.

Thus, the submarine repeating apparatus 100 passes through the linear cable engine device 20 smoothly without getting caught therein.

Besides, the submarine repeating apparatus 100 is cylindrical, and the longitudinal or transverse direction thereof is not specifiable. Thus, the submarine repeating apparatus 100 is positioned in an unfixed direction around the axis thereof while being laid. However, since each of the first to third spacers 121 to 123 is circular, whatever direction the submarine repeating apparatus 100 is positioned around the axis thereof, the first to third spacers 121 to 123 function correctly with respect to the rollers 42 and 43, the roller 41a, and the cable guides 27 and 28.

In addition, the submarine repeating apparatus 100 may be moved with the left boot 103 in FIG. 6 being led in front. In this case, the spacer mechanism 140A between the boot 103 and the joint ring 106 functions in the same manner as the above-described spacer mechanism 140.

Besides, the present invention is not limited to the above-mentioned submarine repeating apparatus 100, but also is applicable to a submarine branching apparatus diverging information, or a gain equalizer.

That is, the present invention is not limited to the specifically disclosed embodiments, and variations and modifications may be made without departing from the scope of the present invention.

The present application is based on Japanese priority application No. 2001-139501 filed on May 10, 2001, the entire contents of which are hereby incorporated by reference.

What is claimed is:

1. A submarine apparatus laid undersea by a submarine-cable laying device, the apparatus comprising:

a cylindrical body performing a signal processing;

a conical boot arranged at each of both ends of said body so as to fix an end of a submarine cable, a diameter of an end of the boot being smaller than a diameter of each of both ends of said body;

a gimbal joint provided on each of both ends of said body so as to support an end of an arm portion extending from said boot; and a spacer mechanism provided between said body and said boot so as to occupy a part of a space therebetween, wherein said spacer mechanism includes a plurality of circular spacers each having a central opening so as to be arranged loosely around said arm portion, each of the spacers having a diameter equal to or smaller than said diameter of each of both ends of said body.

2. The submarine apparatus as claimed in claim 1, wherein each of said spacers has a rib around said central opening.

3. The submarine apparatus as claimed in claim 1, wherein each of said spacers comprises a pair of half members combined with each other.

4. A submarine apparatus laid undersea by a submarine-cable laying device, the apparatus comprising:

a cylindrical body performing a signal processing;

a conical boot arranged at each of both ends of said body as to fix an end of a submarine cable, a diameter of an end of the boot being smaller than a diameter of each of both ends of said body;

a gimbal joint provided on each of both ends of said body so as to support an end of an arm portion extending from said boot; and a spacer mechanism provided between said body and said boot so as to occupy a part of a space therebetween, wherein said spacer mechanism includes a plurality of circular spacers each having a central opening so as to be arranged loosely around said arm portion, the spacers having different diameters decreasing toward said boot, each of the diameters being equal to or smaller than said diameter of each of both ends of said body.

5. The submarine apparatus as claimed in claim 4, wherein each of said spacers has a rib around said central opening.

6. The submarine apparatus as claimed in claim 4, wherein each of said spacers comprises a pair of half members combined with each other.

7. A submarine repeating apparatus comprising:

a cylindrical body;

a conical boot fixed to each end of the cylindrical body at one end and fixed to a cable at an opposite end;

a gimbal joint provided at opposite ends of the cylindrical body to support an arm portion extending from each of the conical boots; and plural spacers filling the spaces between the cylindrical body and each of the conical boots and positioned around the arm portion extending from each of the conical boots.

8. A submarine repeating apparatus comprising:

a cylindrical body;

a boot fixed to each end of the cylindrical body at one end and fixed to a cable at an opposite end;

a joint provided at opposite ends of the cylindrical body to support an arm portion extending from each of the conical boots; and plural spacers substantially filling the spaces between the cylindrical body and each of the boots and positioned around the arm portion extending from each of the boots.

* * * * *